(12) United States Patent
Estrada et al.

(10) Patent No.: US 8,117,823 B2
(45) Date of Patent: Feb. 21, 2012

(54) METHOD AND SYSTEM FOR INCREASING MODIFIED WOBBE INDEX CONTROL RANGE

(75) Inventors: Kelvin R. Estrada, Gaffney, SC (US); John Mart, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/916,102

(22) Filed: Oct. 29, 2010

(65) Prior Publication Data

US 2011/0041504 A1    Feb. 24, 2011

Related U.S. Application Data

(62) Division of application No. 11/668,747, filed on Jan. 30, 2007, now Pat. No. 7,905,082.

(51) Int. Cl.
*F02C 6/00* (2006.01)
*F02G 1/00* (2006.01)
*F02G 3/00* (2006.01)

(52) U.S. Cl. ..................... 60/39.182; 60/39.511; 60/736

(58) Field of Classification Search ............... 60/39.182, 60/39.3, 39.5, 39.511, 736, 730
See application file for complete search history.

(56) References Cited

U.S. PATENT DOCUMENTS

| 4,288,979 A | 9/1981 | Liljedahl et al. |
| 6,920,760 B2 | 7/2005 | Schottler et al. |

*Primary Examiner* — William H Rodriguez
*Assistant Examiner* — Andrew Nguyen
(74) *Attorney, Agent, or Firm* — Nixon & Vanderhye P.C.

(57) ABSTRACT

A system and method for controlling the temperature of a fuel gas. The system and method includes mixing an intermediate pressure feedwater stream from the heat recovery steam generator with a high pressure feedwater stream from the heat recovery steam generator, then using that mixture to heat the fuel gas mixture. The system and method may provide for improved control over the Modified Wobbe Index of the fuel gas, which may allow for greater variation in the composition of the fuel gas.

6 Claims, 5 Drawing Sheets

US 8,117,823 B2

METHOD AND SYSTEM FOR INCREASING MODIFIED WOBBE INDEX CONTROL RANGE

CROSS-REFERENCE TO RELATED APPLICATION

This application is a divisional of application Ser. No. 11/668,747, filed Jan. 30, 2007, the entire contents of which is incorporated herein by reference.

BACKGROUND OF THE INVENTION

The present invention may relate to methods and systems for controlling combustion dynamics in the combustor of a gas turbine and may particularly relate to methods for controlling combustion dynamics for variable fuel gas composition and temperature based on actual calculated fuel flow to the combustor and heat input to the gas turbine.

Industrial-based turbines are often gas-fired and are typically used at power plants to drive generators and produce electrical energy. FIG. 1, for example, schematically illustrates a simple cycle, single-shaft, heavy-duty gas turbine, generally designated 10. The gas turbine comprises an axial flow compressor 12 having a rotor shaft 14. Air enters the inlet of the compressor at 16, is compressed by the axial flow compressor 12 and then is discharged to a combustor 18, where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. The heat exhaust from the turbine is illustrated at 26 and may be used for other purposes, for example, in a combined cycle system. Additionally, there is illustrated a heat exchanger 28 for heating the fuel inlet to the combustor 18 in accordance with the present invention.

A current method of heating the fuel gas is to take intermediate pressure (IP) feedwater from intermediate pressure economizer in the heat recovery steam generator (HRSG) and pipe it into the performance heat exchanger. FIG. 2 schematically illustrates the current method for heating the fuel gas in a simple cycle, single-shaft, heavy-duty gas turbine. Generally, inputs to the turbine include fuel gas 202 and air 204, and outputs include electrical energy 206. Fuel gas 202 enters the system via conduit 210 and may be split at valve 212 into conduits 214 and 216. Via conduit 214 fuel gas enters fuel gas saturator 218, in which the fuel gas is moisturized. Other inputs to fuel gas saturator 218 include water, which enters via conduit 220. Unused water exits the fuel gas saturator 218 via conduit 222, and moisturized fuel gas exits the fuel gas saturator 218 via conduit 224. Via conduits 216 and 224, moisturized and unmoisturized fuel gas are mixed in mixer 226 and fed into heat exchanger 230, which heats the fuel gas prior to introduction into turbine 240 via conduit 232.

Air 204, via conduit 234, enters compressor 236, where it is compressed then is discharged via conduit 238 to turbine 240. Turbine 240 includes a combustor (not shown) where the fuel gas is burned in the presence of air to generate heat and generates electricity by driving a generator (not shown). Electrical energy 206 exits turbine 240 via carrier 250. Exhaust exits the turbine 240 via conduit 242, which connects to HRSG 244. IP feedwater exits HRSG 244 via conduit 246, which introduces the IP feedwater into heat exchanger 230, where it heats the feed gas. After heating the feed gas, the IP feedwater exits heat exchanger 230 via conduit 248. High pressure (HP) feedwater from the intermediate pressure economizer in HRSG 244 exits HRSG 244 via conduit 245, which transports the HP feedwater so that it can heat a series of drums 247 (e.g., low pressure, intermediate pressure, and high pressure).

BRIEF DESCRIPTION OF THE INVENTION

In one embodiment, there is a method for controlling a temperature of a fuel gas, which may be introduced into a turbine for generating electricity. The method includes several steps, including (i) generating an intermediate pressure feedwater stream and a high pressure feedwater stream in a heat recovery steam generator using an exhaust from combustion involving the fuel gas; (ii) introducing the intermediate pressure feedwater stream into a mixer; (iii) introducing a high pressure feedwater stream into the mixer; (iv) mixing in the mixer the intermediate pressure feedwater stream and the high pressure feedwater stream; (v) outputting an output stream from the mixer; (vi) introducing the output stream into a heat exchanger; and (vii) heating the fuel gas in the heat exchanger.

In another embodiment, there is a system for generating electricity. The system includes a heat exchanger for heating fuel gas prior to introduction into a gas turbine; a gas turbine for receiving the heated fuel gas and air, wherein the gas turbine generates electrical energy; a heat recovery steam generator for generating intermediate pressure feedwater and high pressure feedwater; and a mixer for mixing intermediate pressure feedwater generated by the heat recovery steam generator and high pressure feedwater, wherein the output stream of the mixer is introduced into the heat exchanger.

DETAILED DESCRIPTION OF THE INVENTION

Figure 1:
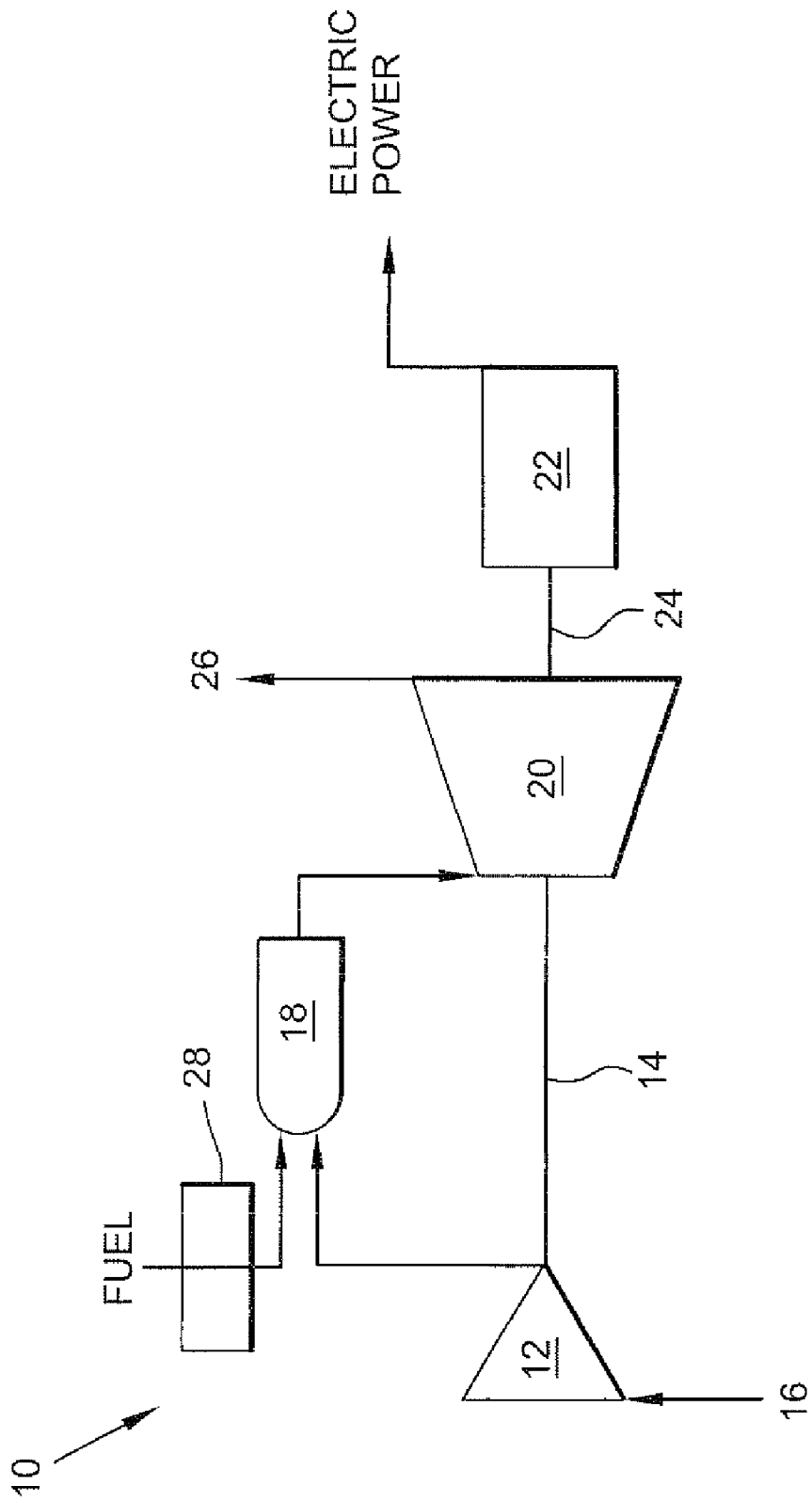
FIG. 1 schematically illustrates a simple cycle, single-shaft, heavy-duty gas turbine FIG. 2 schematically illustrates a prior art method for heating the fuel gas in a simple cycle, single-shaft, heavy-duty gas turbine.
Figure 2:
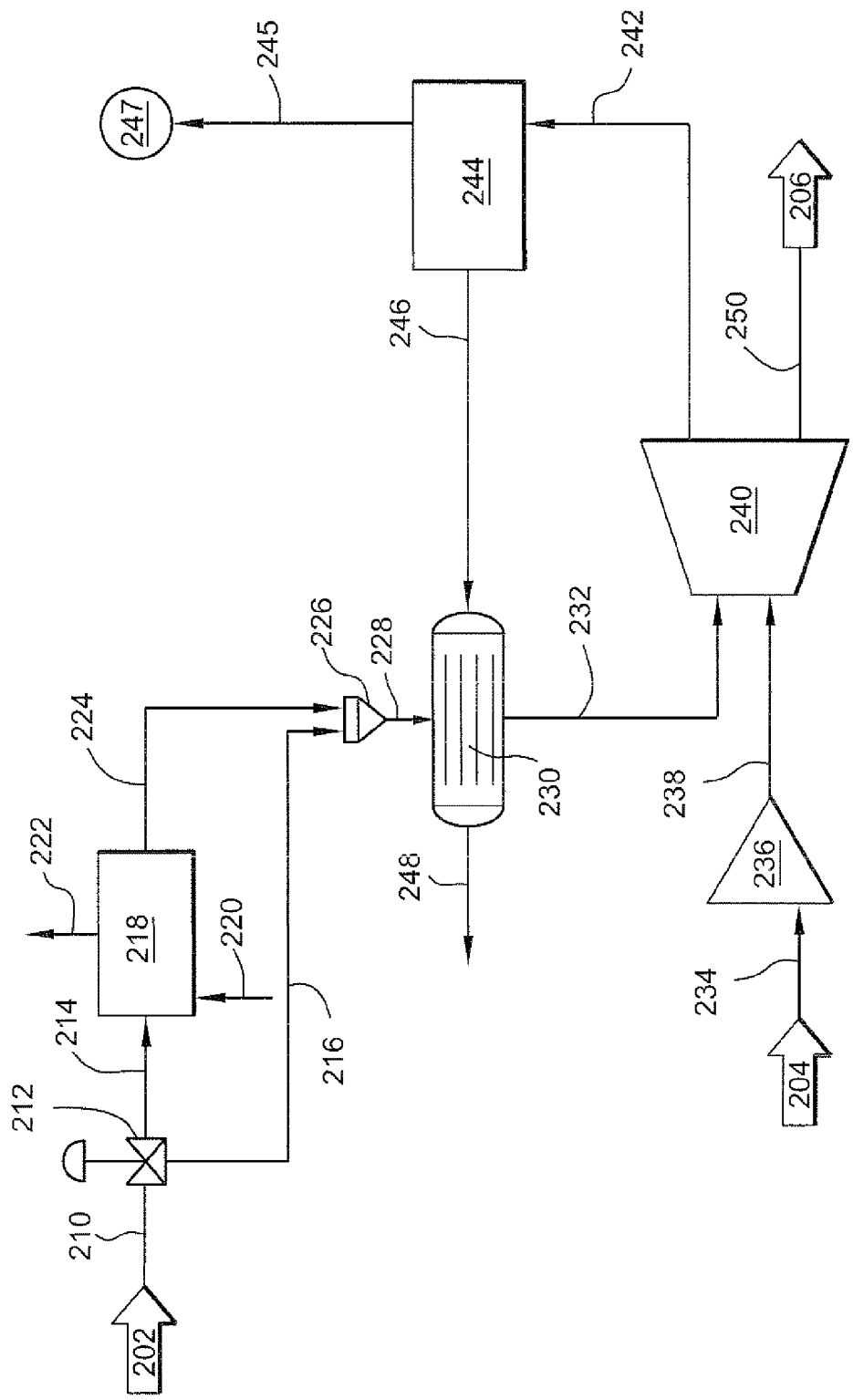

A number of different types of fuel gases may be used for the combustors of turbines, including, for example, natural gas, LNGs such as propane and butane, refinery gases, and coal-derived gases. The energy content of each of these fuels may vary with its source, and of course, there may be variations in energy content among the various types of fuels. The temperature of the fuel gas supplied to the combustor may also be quite different from system to system. For example, many power plants generating electricity from the output of gas turbines may provide a fuel gas heater to provide a constant (or target) fuel gas temperature to the combustor. Other sites may have a number of boost compressors to elevate the temperature. Thus, different sites may provide fuel gas at different temperatures and pressures. Furthermore, several sites may source fuel gas from several different vendors, which implies that both the temperature and composition of the fuel gas may vary.

The standards for setting fuel gas composition and temperature may be characterized by a parameter called the Modified Wobbe Index (MWI). MWI allows comparison of the volumetric energy content of different fuel gases at different temperatures. Since the gas turbine reacts only to energy released in the combustors and the fuel flow control process is generally a volumetric flow control process, fuels of different composition with relatively close values for MWI can generally be provided in the same fuel control system.

MWI is defined as:

$$\text{Modified Wobbe Index } (MWI) = \frac{LHV}{\sqrt{SG_{gas} \times T_{gas}}} = \frac{LHV}{\sqrt{\frac{MW_{gas}}{28.96} \times T_{gas}}}$$

Where:
LHV=Lower Heating Value of the Gas Fuel (Btu/scf)
$SG_{gas}$=Specific Gravity of the Gas Fuel relative to Air
$MW_{gas}$=Molecular Weight of the Gas Fuel
$T_{gas}$=Temperature of the Gas Fuel (° Rankine)
28.96=Molecular Weight of Dry Air Allowable variations in MWI are generally less than +/−5%. Variations in MWI from the specified value can lead to unacceptable levels of combustion dynamics. That is, combustion dynamics may be partially a function of MWI. Consequently, operation at high levels of variations in the MWI from a specified value may result in hardware distress or, possibly, a reduction in component life of the combustion system and/or a potential for power generation outage.

As defined above, MWI is a measure of the volume flow containing a certain amount of energy injected to a gas turbine combustor and, thus, may be a measure of the interchangeability of gas fuel in a given system design. Fuels from different sources or fuels composed of different mixes of gasses may have different energy contents. The fuel system in a gas turbine may be generally sized for a nominal volume flow rate having a certain energy content. Off-design volume flow rate may cause combustion dynamics or other issues. Thus, for a gas turbine to utilize a variety of blended fuels, a method of controlling the MWI may be needed in some circumstances.

Embodiments of the present methods and apparatuses control MWI by modifying the temperature of the fuel. The fuel may be heated above the design point by some percent. This may expand the acceptable range of MWI values for fuel that is to be combusted. This also may facilitate transient periods, such as start up, and decrease the time required for the system to achieve steady state operation.

In an embodiment, this control is proposed to be incorporated by mixing high pressure (HP) feedwater with the IP feedwater from the HRSG. This may increase the heat transfer in the performance heat exchanger allowing higher than nominal fuel temperatures. For example, the HP feedwater may be mixed with IP feedwater up to 1 hour or more after system start up.

At least certain embodiments of the present invention may be used in the fuel gas delivery system. At least certain embodiments of the present invention may increase the effective MWI control range allowing the turbine to operate close to the tuned point, even if the fuel supply is changed and the MWI increases outside the allowable 5% range.

In order to increase the effective MWI control range, the IP feedwater used to heat the gas in the performance heat exchanger must be brought to a higher temperature. In other words, the performance heating system must be designed with some margin that allows heating above the design point. This extra heat capacity may be used to bring the MWI back into spec should it drop below −5% of the nominal MWI set by combustion.

In order to increase the temperature of the IP feedwater, HP feedwater will be mixed with the IP feedwater. The pressure of the HP feedwater will be reduced such that a mixer can be used without the HP feedwater causing a flow reversal in the IP feedwater line. The system may also incorporate a cold water line that will be allowed to mix with the IP feedwater in the event that rapid gas cooling is required (MWI is below the acceptable range). The three streams may be blended; two at a time, to produce either increased temperature or decreased temperature IP feedwater. Of course, the IP feedwater may also be used by itself without any mixing at its natural temperature under normal operating conditions where the MWI is within the system's specification.

Figure 5:
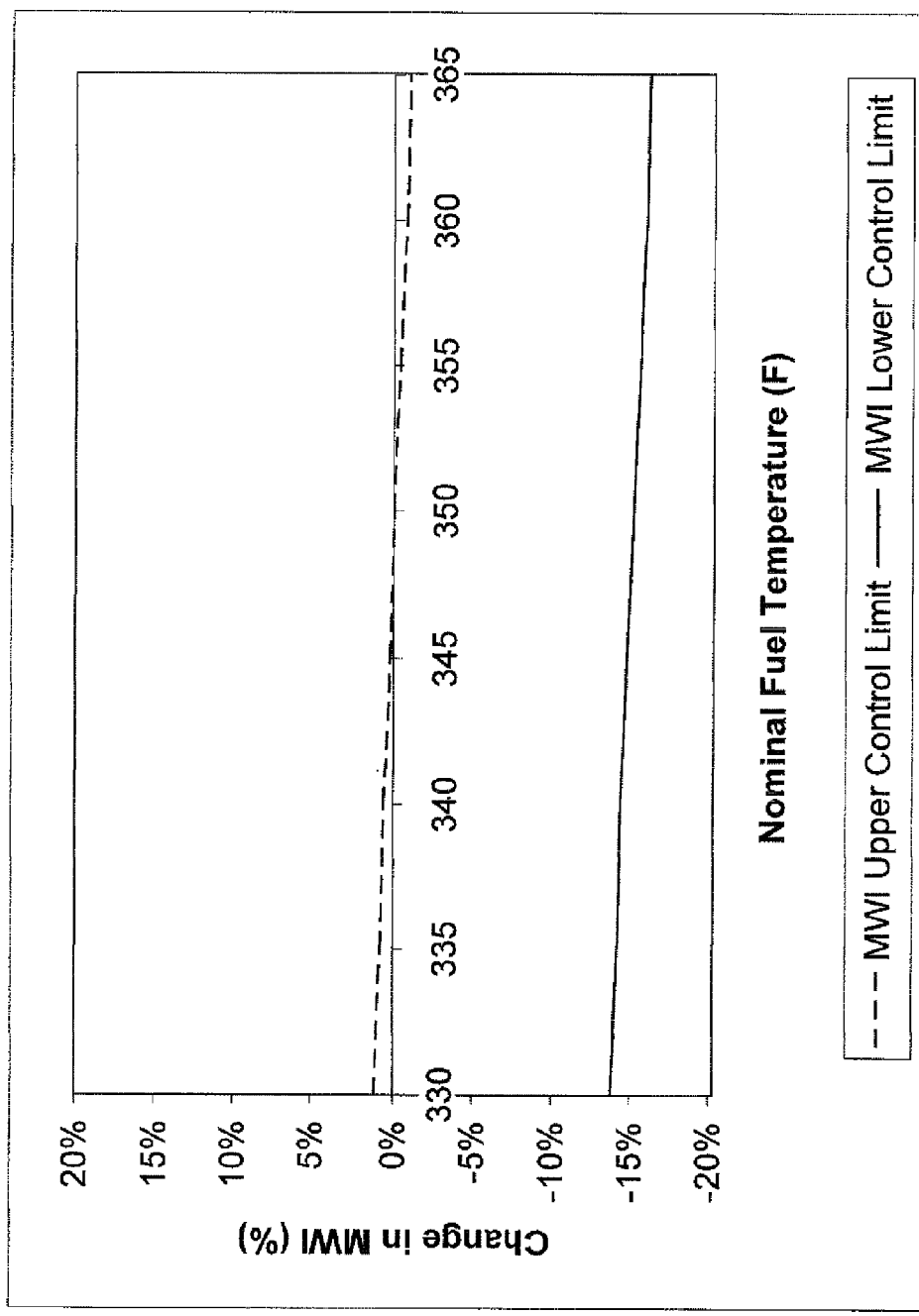
FIG. 5 is a chart illustrating the change in MWI as a function of nominal fuel temperature using a prior art method.

In order to support a flexible fuel supply (i.e., changes in the composition of fuel gas), Modified Wobbe Index (MWI) control possibilities have been explored. Certain embodiments of the present invention facilitate the ability to control the gas temperature, and therefore, MWI, using the performance heat exchanger. While MWI may be adjusted in current designs by reducing fuel temperature, the performance heat exchanger is already operating at the upper-limit of its gas heating ability, which permits the MWI to be controlled over a range of −15% to +1% of the nominal MWI as illustrated in FIG. 5.

Projected fuel Lower Heating Values (LHV) may range from nominal by +/−8%. Combustion limits dictate that the MWI should be controlled to +/−5% of the nominal value. Thus, under the current design, the error can only be reduced from +8% to 7%. In some embodiments of the present invention, the error may be reduced from +8% to +3%, which is within the acceptable range of MWI error.

While the current design will allow the MWI to be adjusted over a limited range, at least certain embodiments of the present invention will expand the range over which MWI may be controlled. The upper limit of MWI controllability may be increased further if the pressure of the water entering the performance heat exchanger is increased. This may be possible by using the HP feedwater to boost the mixed water pressure, thereby increasing the saturation point of the water and allowing its temperature to rise without forming steam.

Figure 3:
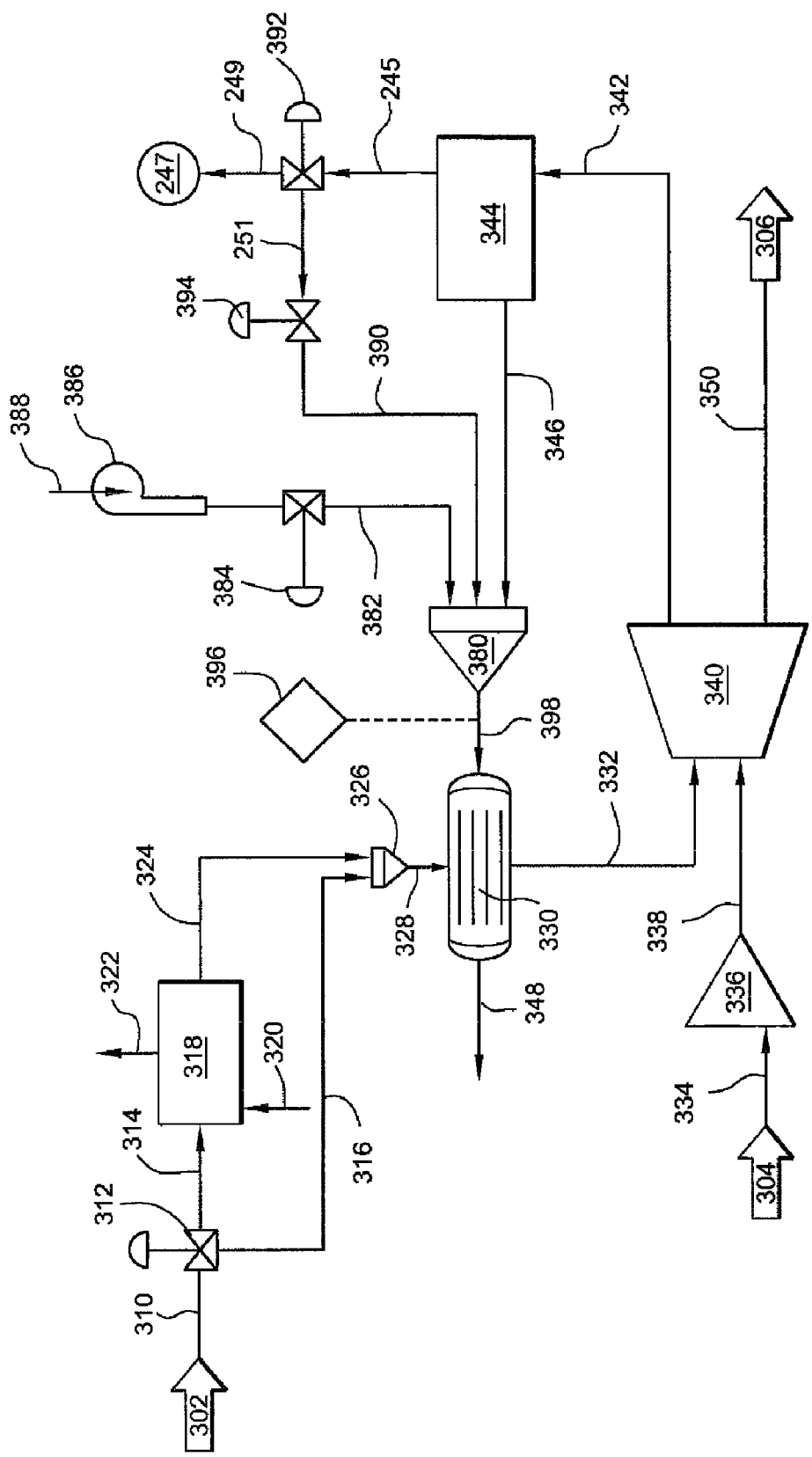
FIG. 3 schematically illustrates an embodiment of the present invention in a simple cycle, single-shaft, heavy-duty gas turbine.

FIG. 3 schematically illustrates an embodiment of the present invention in a simple cycle, single-shaft, heavy-duty gas turbine. Generally, inputs to the turbine include fuel gas 302 and air 304, and outputs include electrical energy 306. Fuel gas 302 enters the system via conduit 310 and may be split at valve 312 into conduits 314 and 316. Via conduit 214 fuel gas enters fuel gas saturator 318, in which the fuel gas is moisturized. Other inputs to fuel gas saturator 318 include water, which enters via conduit 320. Unused water exits the fuel gas saturator 318 via conduit 322, and moisturized fuel gas exits the fuel gas saturator 318 via conduit 324. Via conduits 316 and 324, moisturized and unmoisturized fuel gas are mixed in mixer 326 and fed via conduit 328 into heat exchanger 330, which heats the fuel gas prior to introduction into turbine 340 via conduit 332. By controlling the inputs into mixer 326, the moisture content of the fuel gas introduced into turbine 340 can be controlled.

Air 304, via conduit 334, enters compressor 336, where it is compressed then is discharged via conduit 338 to turbine 340. Turbine 340 includes a combustor (not shown) where the fuel gas is burned in the presence of air to generate heat and generates electricity by driving a generator (not shown). Electrical energy 306 exits turbine 340 via carrier 350.

Exhaust exits the turbine 340 via conduit 342, which connects to HRSG 344. IP feedwater from the intermediate pressure economizer in HRSG 344 exits HRSG 344 via conduit 346, which introduces the IP feedwater into mixer 380. HP feedwater from the intermediate pressure economizer in HRSG 244 exits HRSG 244 via conduit 245, where it is split via valve 392 into conduits 249 and 251. Valve 392 controls the relative flowrates of HP feedwater into conduits 249 and 251. Conduit 249 carries the HP feedwater so that it can heat a series of drums 247 (e.g., low pressure, intermediate pressure, and high pressure). Via conduit 251 and valve 394, some HP feedwater is fed into mixer 380 via conduit 390.

In addition to IP feedwater via conduit 346 and HP feedwater via conduit 390, another input to mixer 380 is cold water via conduit 382. The output from mixer 380 is then introduced into heat exchanger 330, where it heats the feed gas. After heating the feed gas, it exits heat exchanger 330 via conduit 348. The operational parameters (e.g., temperature, pressure, etc.) of the output of mixer 380 are measured via measuring device(s) 396. Measuring device sends a control signal to valves 392 and 384, which control the flowrate of the HP feedwater and cold water. In addition, cold water entering the mixer 380 may be pressurized using pump 386, which is fed by conduit 388 from the cold water supply. Similarly, the pressure of the HP feedwater may be controlled via pressure reducing valve 394.

In an embodiment, the IP feedwater has a temperature of 380° F. and a mass flowrate of 50,000 pounds per hour (pph). The HP feedwater has a temperature of 600° F. and a mass flowrate of 4100 pph. In this embodiment, the output of mixer 380 has a temperature of 440° F. The fuel gas fed to heat exchanger 330 has a temperature of 55° F. Upon exiting heat exchanger 330 via conduit 332, the fuel gas has a temperature of 335° F. In some embodiments, the fuel gas has a temperature of up to 425° F. The above temperatures and mass flowrates are approximate and may vary depending on specific operating conditions.

Figure 4:
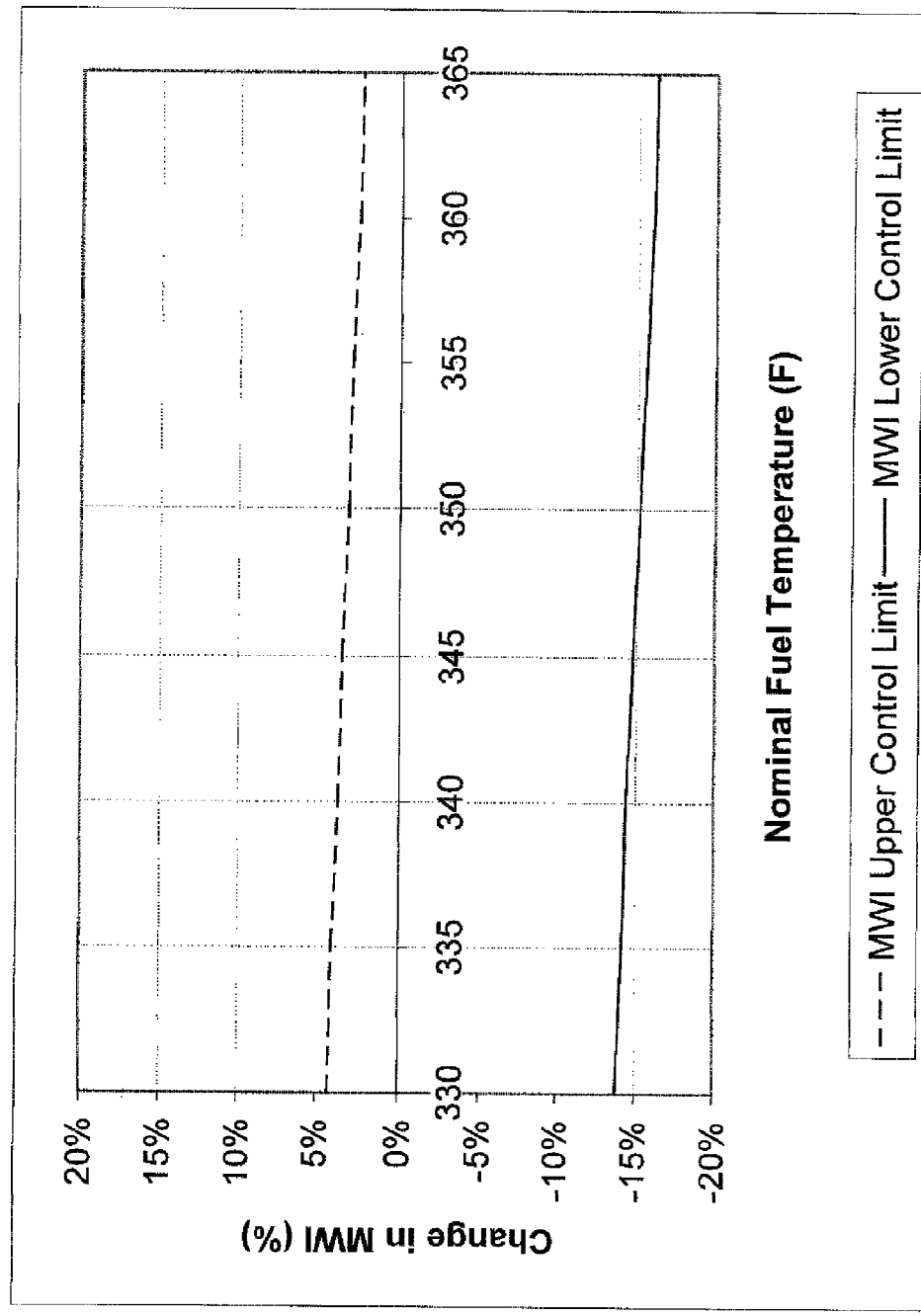
FIG. 4 is a chart illustrating the change in MWI as a function of nominal fuel temperature in accordance with an embodiment of the present invention.

FIG. 4 provides a chart illustrating the change in MWI as a function of nominal fuel temperature using a method in accordance with an embodiment of the present invention. FIG. 4 shows that the effective MWI control range can be above 5% using a method in accordance with an embodiment of the present invention.

In the prior art method using only IP feedwater (generally having a temperature of 380° F.), the effective MWI control range is 1%. FIG. 5 provides a chart illustrating the change in MWI as a function of nominal fuel temperature using a prior art method.

Table 1 illustrates certain operating conditions of the heat exchanger (Horizontal with NTIW-Segmental Baffles) in accordance with an exemplary embodiment. Table 1 shows that the fuel gas may be heated to 410° F.

TABLE 1

Operating conditions of the heat exchanger in accordance with an exemplary embodiment.

| Process Conditions | | Cold Shell | | Hot Tube | |
|---|---|---|---|---|---|
| Flow rate | (1000-lb/hr) | | 75 | | 55 |
| Inlet/Outlet Y | (Wt. frac vap.) | 1 | 1 | 0 | 0 |
| Inlet/Outlet T | (Deg F.) | 55 | 410 | 440 | 150 |
| Inlet P/Avg | (psia) | 490 | | 410 | |

It is noted that as described and claimed, all numbers and numerical ranges are approximate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling a temperature of a fuel gas, the method comprising the steps of:
   generating an intermediate pressure feedwater stream and a high pressure feedwater stream in a heat recovery steam generator using an exhaust from combustion in a gas turbine involving the fuel gas;
   introducing the intermediate pressure feedwater stream into a mixer;
   introducing the high pressure feedwater stream into the mixer;
   mixing in the mixer the intermediate pressure feedwater stream and the high pressure feedwater stream;
   outputting an output stream from the mixer;
   introducing the output stream into a heat exchanger;
   heating the fuel gas in the heat exchanger; and
   increasing or decreasing a mass flowrate of the high pressure feedwater stream to achieve a targeted temperature or pressure of the output stream to affect a Modified Wobbe Index of the fuel gas; and
   wherein the step of heating the fuel gas in the heat exchanger controls the Modified Wobbe Index and facilitates correction of +10% error in the Modified Wobbe Index of the fuel gas.

2. The method of claim 1 further comprising the steps of: introducing a cold water stream into the mixer and mixing in the mixer the intermediate pressure feedwater stream, the high pressure feedwater stream, and the cold water stream.

3. The method of claim 1 further comprising the step of controlling a pressure of the output stream by adjusting a pressure reducing valve that affects the pressure of the high pressure feedwater stream.

4. The method of claim 1 further comprising the steps of:
   monitoring a temperature of the output stream;
   monitoring a pressure of the output stream.

5. The method of claim 1 further comprising the step of outputting the fuel gas from the heat exchanger, wherein the fuel gas has a temperature of at least 335° F. after exiting the heat exchanger.

6. The method of claim 5, wherein the fuel gas has a temperature of up to 425° F. after exiting the heat exchanger.

* * * * *